Patented Mar. 26, 1929.

1,706,933

UNITED STATES PATENT OFFICE.

WALTER MIEG, OF VOHWINKEL, GERMANY, ASSIGNOR TO GRASSELLI DYESTUFF CORPORATION, OF NEW YORK, N. Y., A CORPORATION OF DELAWARE.

PROCESS FOR THE MANUFACTURE OF VAT DYESTUFFS OF THE ANTHRAQUINONE SERIES.

No Drawing. Application filed March 22, 1927. Serial No. 177,474, and in Germany March 24, 1926.

The present invention relates to a process for preparing new vat dyestuffs of the anthraquinone series having the general formula:

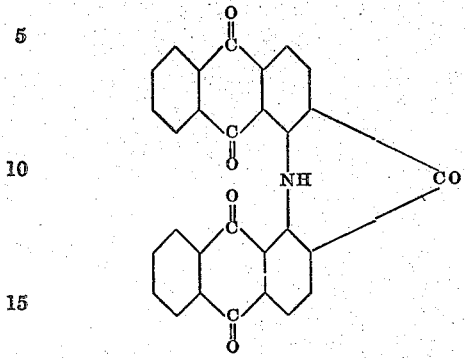

wherein the anthraquinone nuclei may be substituted and to dyestuffs obtainable thereby.

I have found that our new dyestuffs are obtainable by causing a-1-aminoanthraquinone-2-aldehyde to be reacted upon by an alpha-halogen-anthraquinone in the presence of a suitable catalyst such as copper or a salt thereof and an acid-binding agent such as anhydrous sodium acetate, intermediate products are obtainable having probably the general formula:

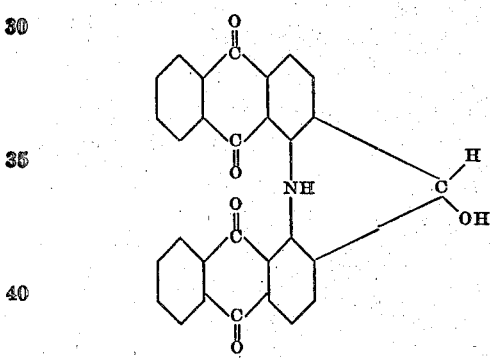

wherein the anthraquinone nuclei may be substituted.

It has further been found that these intermediate products can easily be converted into the corresponding diphthaloyl acridones of the general formula:

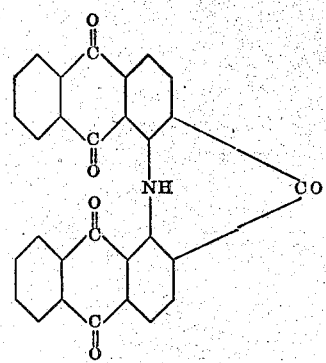

wherein the anthraquinone nuclei may be substituted.

We prefer to prepare the intermediate products by dispersing the components together with the catalyst and the acid-binding agent in a high-boiling organic solvent, as for instance nitrobenzene, and heating the reaction mixtures for 1-2 hours while stirring. The conversion of the intermediate products into the corresponding diphthaloyl acridones may be effected either by vatting and reoxidizing by means of air or by dissolving the intermediate products in sulfuric acid, precipitating them with water, and heating the acid pastes to the boiling point. It is sometimes advantageous to render the acid pastes, above-mentioned, alkaline and then to heat the alkaline pastes to the boiling point.

The following examples are intended to illustrate our invention without limiting it thereto, all parts being by weight.

*Example 1.*—10 parts of 1-aminoanthraquinone-2-aldehyde, 10 parts of 1-chloro-anthraquinone, 7 parts of anhydrous sodium acetate and 0.1 part of copper powder are heated in 100 parts of nitrobenzene to the boiling point for about 1-2 hours while stirring until the formation of the reaction product is finished. By heating the reaction mixture for a too prolonged time the purity of the reaction product will be impaired. From the cooled melt brownish red crystals separate, which are filtered, washed with alcohol and water and freed from copper by boiling with a suitable solvent, as for example, hydrochloric acid containing copper chloride. With alkaline hydrosulphite a reddish-brown vat is obtained from which cotton is dyed in dull brownish yellow shades.

The yellowish brown solution of this intermediate product of the probable formula:

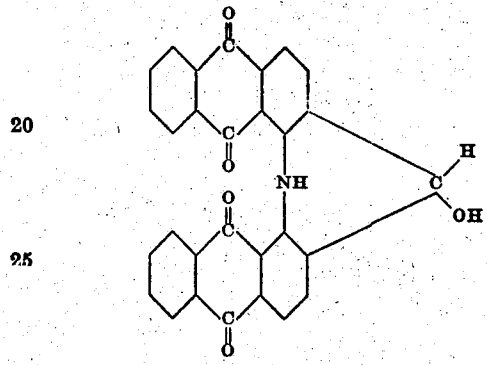

in concentrated sulfuric acid no longer gives the colour change characteristic for dianthraquinonyl amines neither with formaldehyde nor with boric acid. When the sulfuric acid solution is poured into water, a reddish brown precipitate is obtained, which already yields stronger dyeings than the compound not treated with sulfuric acid. It will be advantageous, however, to boil the precipitate for some time with dilute caustic soda lye until the paste has assumed a clear orange shade. The dyestuff thus prepared having probably the formula:

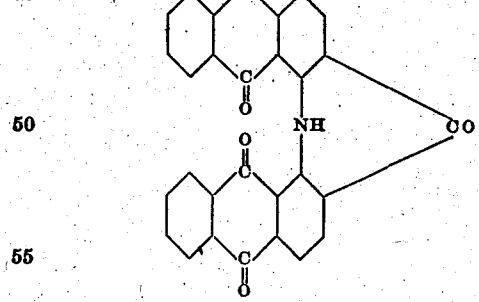

dyes cotton from the vat clear and strong brownish yellow shades.

Example 2.—12 parts of 1-benzoylamino-5-chloro-anthraquinone 8 parts of 1-aminoanthraquinone-2-aldehyde, 6 parts of anhydrous sodium acetate 0.2 parts of copper powder are boiled in 120 parts of nitrobenzene for about 2 hours while stirring. The reaction product having probably the formula:

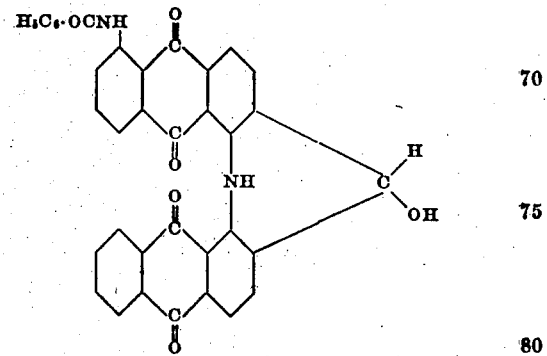

separates in brownish red crystals and may be isolated as described in Example 1. It dissolves in concentrated sulfuric acid with a yellow colouration.

In order to convert this intermediate product into the corresponding diphthaloyl acridone of the formula:

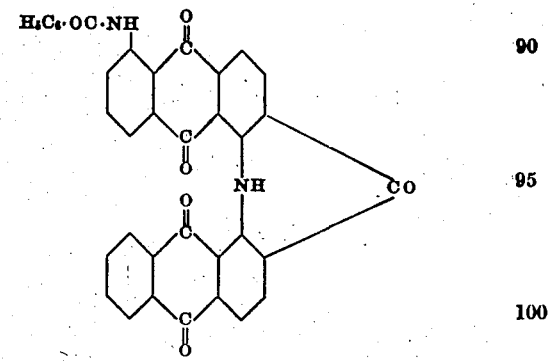

it will be sufficient to precipitate it from its solution in concentrated sulfuric acid by means of water and to heat the acid paste to the boiling point. The dyestuff thus obtained dyes cotton from the vat clear brownish-yellow shades.

When 1-benzoylamino-4-chloroanthraquinone is employed, instead of the 5-chloro derivative, a dyestuff is obtained, which dyes cotton fast dark blue violet shades.

I claim:—

1. In the process of preparing vat dyestuffs of the anthraquinone series the step which comprises causing a 1-aminoanthraquinone-2-aldehyde compound to be reacted upon by an alpha-halogenanthraquinone compound in the presence of a catalyst and an acid-binding agent.

2. In the process of preparing vat dyestuffs of the anthraquinone series the step which comprises causing a 1-aminoanthraquinone-2-aldehyde compound to be reacted upon by an alpha-halogenanthraquinone compound in the presence of a catalyst and an acid-binding agent in boiling nitrobenzene.

3. In the process of preparing vat dyestuffs of the anthraquinone series the step which comprises causing a 1-aminoanthraquinone-2-aldehyde compound to be reacted upon by an alpha-chloroanthraquinone compound in the presence of copper powder and an acid-binding agent in a high-boiling organic diluent at elevated temperature.

4. In the process of preparing vat dyestuffs of the anthraquinone series the step which comprises causing a 1-aminoanthraquinone-2-aldehyde compound to be reacted upon by an alpha-chloroanthraquinone compound in the presence of copper powder and an acid-binding agent in boiling nitrobenzene.

5. In the process of preparing vat dyestuffs of the anthraquinone series the step which comprises causing a 1-aminoanthraquinone-2-aldehyde compound to be reacted upon by 1-benzoyl-amido-5-chloroanthraquinone in the presence of catalyst and an acid-binding agent in a high-boiling organic solvent at elevated temperature.

6. In the process of preparing vat dyestuffs of the anthraquinone series the step which comprises causing 1-aminoanthraquinone-2-aldehyde to be reacted upon by 1-benzoylamido-5-chloroanthraquinone in the presence of copper powder and an acid-binding agent in boiling nitrobenzene.

7. The process for the manufacture of vat dyestuffs of the anthraquinone series which consists in causing 1-aminoanthraquinone-2-aldehyde to be reacted upon by an alpha-chloroanthraquinone compound in the presence of a catalyst and an acid-binding agent in a high-boiling organic solvent at elevated temperature, isolating the intermediate product, dissolving it in concentrated sulfuric acid, precipitating it again by means of water and heating the acid paste to the boiling point.

8. The process for the manufacture of vat dyestuffs of the anthraquinone series which consists in causing 1-aminoanthraquinone-2-aldehyde to be reacted upon by an alpha-chloroanthraquinone compound in the presence of copper powder and an acid-binding agent in boiling nitrobenzene, isolating the intermediate product, dissolving it in concentrated sulfuric acid, precipitating it again by means of water, and heating the acid paste to the boiling point.

9. The process for the manufacture of vat dyestuffs of the anthraquinone series which consists in causing 1-aminoanthraquinone-2-aldehyde to be reacted upon by an alpha-benzoylamido-alpha-chloro anthraquinone compound in the presence of a suitable catalyst and an acid-binding agent in a high-boiling organic solvent at elevated temperature, isolating the intermediate product, dissolving it in concentrated sulfuric acid, precipitating it again by means of water, and heating the acid paste to the boiling point.

10. The process for the manufacture of vat dyestuffs of the anthraquinone series which consists in causing 1-aminoanthraquinone-2-aldehyde to be reacted upon by 1-benzoylamido-5-chloroanthraquinone in the presence of a suitable catalyst and an acid-binding agent in a high-boiling organic solvent at elevated temperature, isolating the intermediate product, dissolving it in concentrated sulfuric acid, precipitating it again by means of water, and heating the acid paste to the boiling point.

11. The process for the manufacture of vat dyestuffs of the anthraquinone series which consists in causing 1-aminoanthraquinone-2-aldehyde to be reacted upon by 1-benzoyl-amido-5-chloroanthraquinone in the presence of copper powder and an acid-binding agent in boiling nitrobenzene, isolating the intermediate product, dissolving it in concentrated sulfuric acid, precipitating it again by means of water, and heating the acid paste to the boiling point.

12. The new vat dyestuffs of the probable general formula:

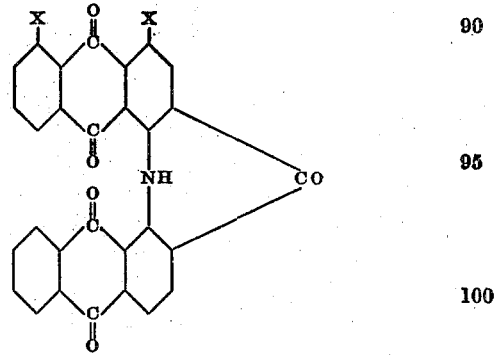

wherein one X represents the benzoylamino group $C_6H_5.CO.NH$ and the other X represents hydrogen.

13. The new dyestuff of the probable formula:

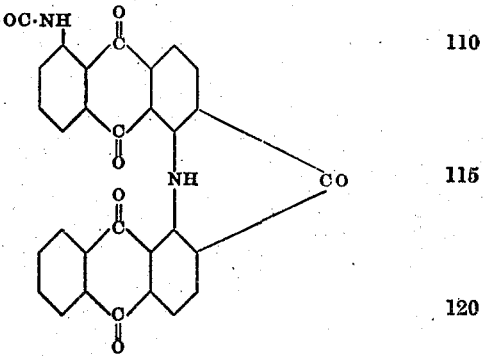

dyeing cotton from the vat clear brownish-orange shades.

In testimony whereof, I affix my signature.

WALTER MIEG.